United States Patent

[11] 3,614,479

[72] Inventor David E. Nelson
 St. Cloud, Minn.
[21] Appl. No. 843,160
[22] Filed July 18, 1969
[45] Patented Oct. 19, 1971
[73] Assignee DeZurik Corporation
 Sartell, Minn.

[54] POWER SUPPLY AND SIGNAL CONDITIONER FOR ELECTRONER FOR ELECTRONIC INSTRUMENTATION
8 Claims, 4 Drawing Figs.

[52] U.S. Cl. .................................................. 307/297,
 323/4, 323/39
[51] Int. Cl. ..................................................... H03k 1/14
[50] Field of Search .......................................... 307/297;
 323/4, 39, 22 T

[56] References Cited
UNITED STATES PATENTS
3,231,829 1/1966 Reid ............................ 331/27 X
3,440,518 4/1969 Cliffgard et al. .............. 323/4
3,448,372 6/1969 Goff ............................. 323/39 X

*Primary Examiner*—Roy Lake
*Assistant Examiner*—James B. Mullins
*Attorney*—Wolfe, Hubbard, Leydig, Voit & Osann ABSTRACT: An electronic signal conditioner for use with process control instruments is described in which a signal from a transmitting instrument is received and conditioned by way of damping and current limiting before being retransmitted to control apparatus. The output signal is essentially independent of the internal impedance of the receiving apparatus.

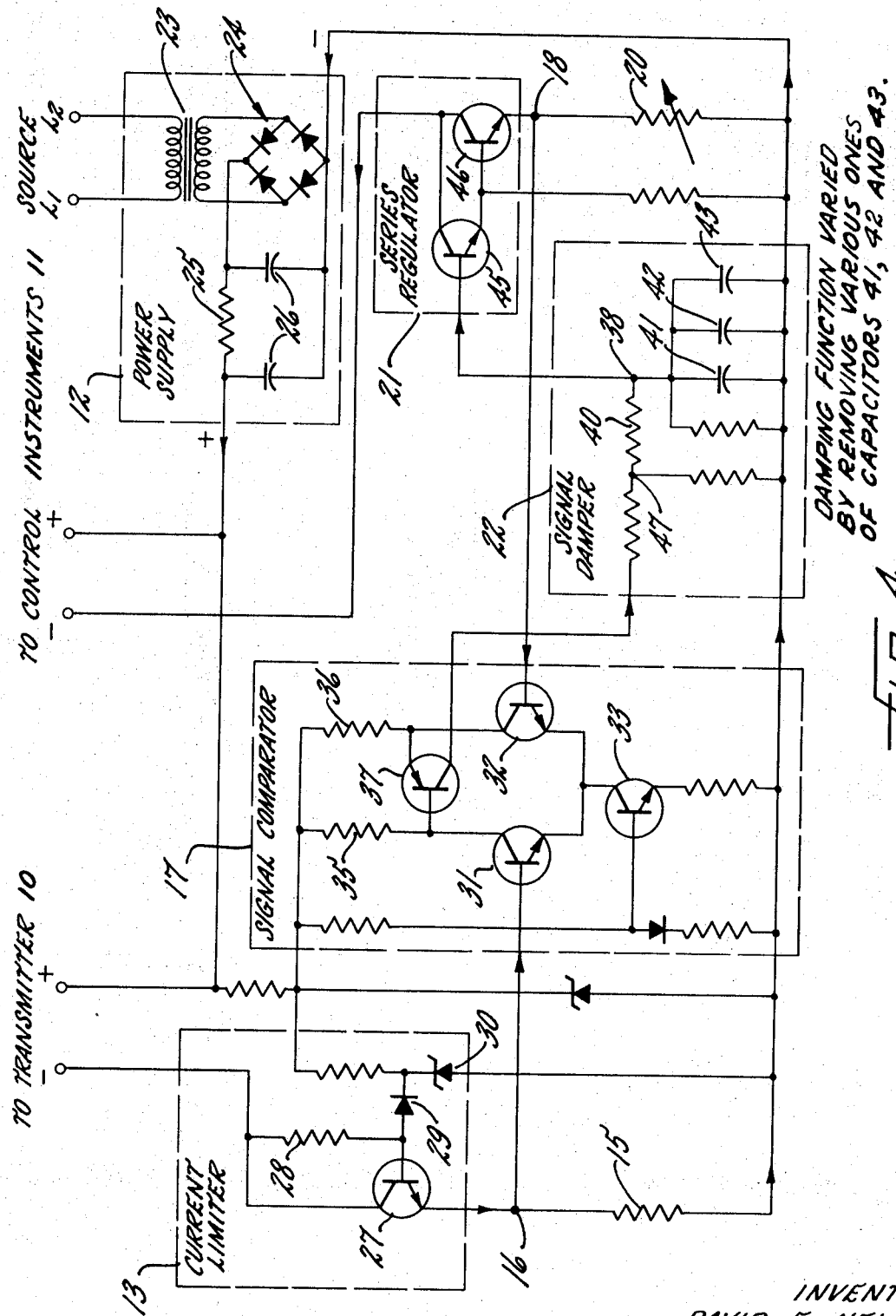

3,614,479

POWER SUPPLY AND SIGNAL CONDITIONER FOR ELECTRONER FOR ELECTRONIC INSTRUMENTATION

DESCRIPTION OF THE INVENTION

This invention relates generally to electronic instrumentation, and in its principal aspect concerns an improved means for receiving and conditioning an electrical signal and retransmitting the signal in improved form to further instrumentation or to process control apparatus.

A principal object of the present invention is to provide apparatus for receiving, conditioning and retransmitting an electrical signal from a distant transmitting device to subsequent control or instrumentation equipment. As part of the conditioning function, it is intended to provide current-limiting means for protection of overload, damping means for damping of noise signals including rapid fluctuations and transients, and regulation of the output signal in a manner which is essentially independent of the load impedance of the instrumentation or control apparatus into which it is fed.

More specifically, it is an object of the present invention to provide a signal conditioning apparatus in which the output signal is proportional to any steady-state input signal, but with a damping function that causes the rate of change of the output signal to be constant regardless of the magnitude of input signal change, in contrast to existing resistance-capacitance damping circuits which cause the signal to approach its steady-state valve asymptotically. With the improved conditioning apparatus of the present invention, the transmitted output signal is enabled to follow the input signal with substantially linear response until reaching its new steady-state value.

These and other objects and advantages of the invention will become apparent upon reading the following specification and upon reference to the drawings, in which.

Figure 1:
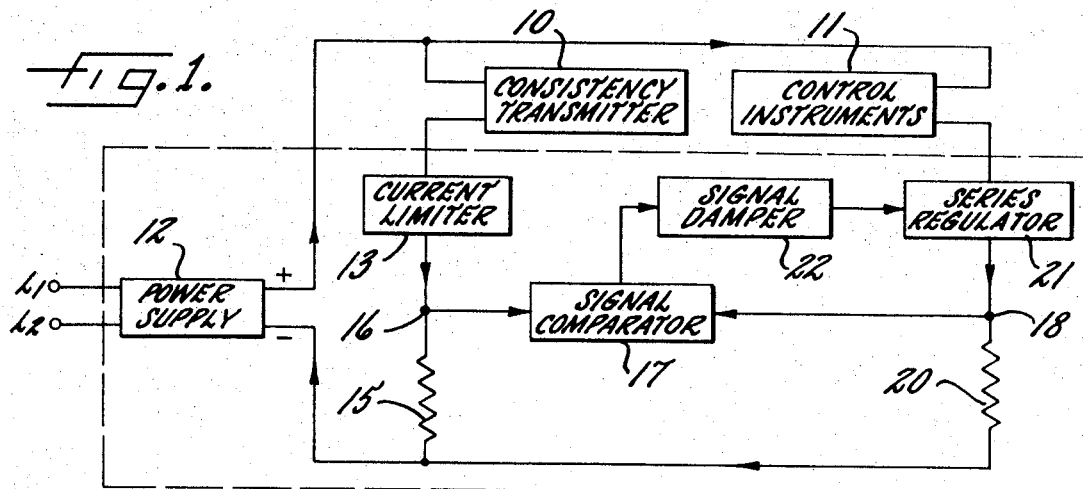
FIG. 1 is a simplified schematic block diagram of a power supply and signal-conditioning apparatus exemplifying the present invention.
Figure 2:
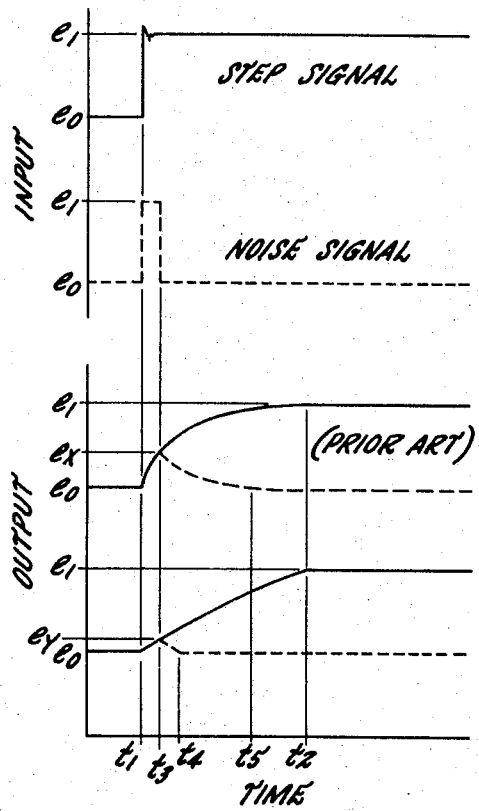
FIG. 2 is a graph of typical response curves obtained from a conditioning circuit constructed according to the invention for a step-function fluctuation (solid lines) and a pulse fluctuation (dashed lines), as compared with the corresponding response curves typical of a prior art resistance-capacitance circuit capable of reaching substantially the same steady-state value $e_1$ at a time $t_2$.
Figure 3:
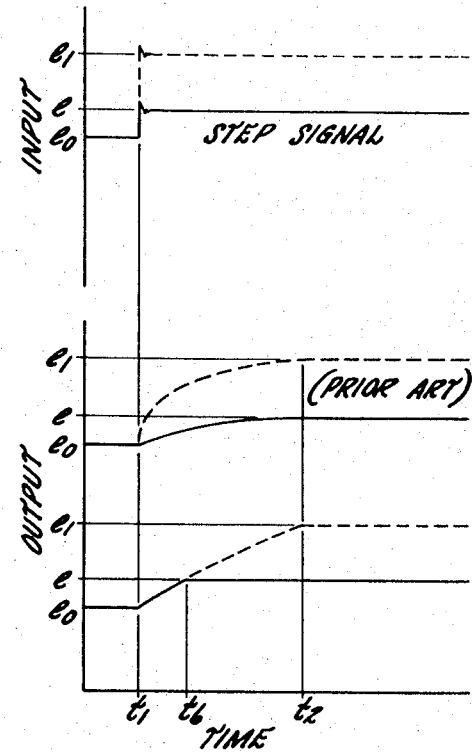

FIG. 3 is a graph of typical response curves similar to FIG. 2, for two step-function input signal fluctuations of different magnitudes, again as compared with the corresponding response curves typical of a prior art resistance-capacitance circuit capable of reaching substantially the same steady-state valves $e$ and $e_1$ at a time $t_2$; and FIG. 4 is a detailed schematic circuit diagram of the power supply and signal conditioner shown in FIG. 1.

BACKGROUND AND ENVIRONMENT

The requirements of electronic compatibility in process control equipment have become more and more strict as industrial processes become increasingly more automated. A flow-sensing device, for example, may have an electrical output characteristic which is not directly compatible with the instrumentation which depends on it for information. The output signal from the transmitter of the sensing device may be of the wrong magnitude or range, may have the wrong electrical impedance for proper matching, and may be subject to sharp signal fluctuations and transients as well as spikes of excessive voltage or current which can disrupt or damage the receiving equipment. Such equipment often includes computers for automated process control applications and the consequences of such disruption or damage are substantial. An entire industrial process can often be shut down by a single such malfunction. The compatibility problem is in part caused by the common use of four different signal level ranges for instrumentation equipment. These ranges are nominally 1–5 ma., 4–20 ma., and 1–5 volts. Unless sensing equipment is carefully chosen to be compatible with the instrumentation with which it is to be used, the system will not function.

Another problem of compatibility arises from the presence of sharp fluctuations and transients, including random variations described as signal noise. Some sensing equipment, particularly sensors of small physical size, will exhibit enhanced high-frequency response characteristics and will detect and transmit rapid local fluctuations even though its related process control equipment may be incapable of responding rapidly enough to follow. It is unnecessary and often detrimental for the process control equipment to even attempt to follow such small and random variations, particularly where the presence of feedback in the system may give rise to oscillation and instability. In addition, a control system which is proportionally responsive to the rate of increase detected by the sensor will overreact to a sharp pulse or spike even of momentary duration, again causing needless changes in the system which must be corrected for when the pulse or spike is dissipated.

Finally, certain processes are inherently subject to rapid and random localized fluctuations rather than changing smoothly and gradually. For example, the flow of wood pulp in a conduit may be detected by a sensor of relatively small physical size which can be momentarily deflected by localized pockets of heavier material even though the average density of the material is essentially constant. Since these local variations cannot be controlled, they must be classified as noise signals and can be detrimental to the control function.

Some solutions have been proposed in which damping is provided within the system, either electronically or mechanically. Mechanical devices can be installed in the sensor in the form of dashpots and the like but such mechanical devices are inherently difficult to adjust, subject to changing characteristics with age, temperature and wear, and may not be responsive to very small input fluctuations. Electronic damping has been used with simple amplifier circuits but such damping has generally been of the type which acts directly on the input or output signal with a simple resistance-capacitance damping circuit. A difficulty with such damping circuits is that they are not practical with circuits having relatively low impedances. The capacitance necessary to furnish effective damping with an impedance of, for example, 100 ohms, may be several thousand microfarads. Capacitors of this size are subject to deterioration with age and temperature and the damping function will consequently change with time. In addition, these capacitors are expensive to buy, large to install, and may differ widely in capacitance for the same nominal value.

If the output range of the signal conditioning device is to be made variable, this often requires extensive changes in the damping circuit to achieve the same relative damping effectiveness and constitutes another disadvantage in the damping circuits of existing equipment.

GENERAL OPERATION

Turning first to FIG. 1, the simplified block diagram shown therein illustrates the various functional elements of the improved apparatus constructed according to the invention. In this illustrative embodiment, the apparatus combines the functions of a power supply and signal conditioner for a process sensor such as a wood pulp consistency transmitter 10 and is mounted on a single chassis (not shown) to which control instruments 11 or other related equipment may be simply and directly connected. The consistency transmitter 10 or other sensing device is connected to one set of terminals and the control instrumentation 11, whether it be a meter or a sophisticated computer apparatus, is connected at a second set of terminals on the same chassis.

An internal power supply 12 is connected to a source of power such as an ordinary AC line $L_1$, $L_2$ and furnishes electrical power for the rest of the apparatus. Incoming line voltage is rectified and filtered by the power supply 12 to produce DC power for the transmitter and the remaining portion of the current conditioning apparatus including the output loop. The DC current going to the transmitter 10 is impressed with a signal which is a function of the process being monitored and then returns to the signal-conditioning apparatus. This output signal from the transmitter 10 goes first through a receiving means including current-limiting circuit 13 which protects the remaining portions of the circuit from overload and then through a sensing resistor 15 to generate a signal voltage at a point 16. This voltage is then supplied to a comparison means consisting of a high-impedance comparator circuit 17.

The comparator circuit 17 compares the signal produced at point 16 with that produced at an adjoining point 18, which is a function of output current passing through a second sensing resistor 20. The instantaneous magnitude of the output current to the instrumentation 11 is controlled by a regulator circuit 21, and its magnitude is represented at all times by the voltage appearing at point 18 due to the voltage drop across the second sensing resistor 20. If there is no change in the steady-state signals produced by the transmitter 10 and seen by the instrumentation 11, then no error signal is produced by the comparator circuit 17. If, however, a fluctuation appears, then an error signal is produced by the comparator circuit 17 and supplied as a correction to the regulator 21 through a damping means consisting of a signal-damping circuit 22.

As a principal feature of the invention, increased accuracy and dependability are achieved because the damping circuit 22 is separate from the output signal path. With conventional circuits, a change in damping capacitors will have the same effect on the instrumentation 11 as a change in input signal, resulting in an error signal which is uncorrected. While this can be minimized by adding feedback circuitry, the improved circuit is free from this requirement and can therefore be located at any convenient point in the signal transmission line. The independence of the damping circuit 22 from both input and output signal paths also allows it to use a desirably high impedance for ease of construction and increase component reliability. The error signal after damping by the damping circuit 22 causes a corrective change in the regulator circuit 21 to vary the current flow through the instrumentation 11 and the second sensing resistor 20, bringing the voltage at point 18 back into correspondence with that at point 16.

It will be seen that because the comparator circuit 17 is sensitive to the voltage at point 18 and not the absolute value of instrument current, the current flowing through the output loop consisting of the instrumentation 11, regulator 21 and second sensing resistor 20 may be varied by simply changing the value of the second sensing resistor 20. Different ranges of output current may be obtained in this way without affecting the operation of the comparator circuit 17 or the damping circuit 22, making them entirely independent of the output range in use.

CIRCUIT DESCRIPTION

A detailed understanding of the operation of the circuit of the present exemplary embodiment of the invention may be gained by referring to FIG. 4. The power supply 12 receives AC power through a transformer 23 and the voltage is rectified by a diode bridge 24. A filtering circuit consisting of a resistor 25 and filter capacitors 26 provides a regulated DC output to both the transmitter 10 and the instrumentation 11.

From the transmitter 10, an input signal is obtained which is directed to the current-limiting circuit 13. A transistor 27 is normally held in an on condition by a resistor 28 and presents very little impedance to the signal current. If the input signal becomes excessive, at some predetermined point, preferably 110 percent of the rated signal current, the base voltage of the transistor 27 will rise to a point that will cause current to flow through a blocking diode 29 into a zener diode 30, preventing the base voltage of the transistor 27 from rising any further. Any further increases in signal current will then only tend to turn the transistor 27 off, thereby limiting the peak voltage at point 16 and protecting the remainder of the circuit.

Assuming normal operation and a transmitter 10 having a characteristic current range of 10–50 ma., a signal value of 50 percent will represent an input current of 30 ma. This current flowing through the sensing resistor 15 develops an input signal at the point 16 which is fed to the comparator circuit 17 containing transistors 31 and 32. The total current through the transistors 31, 32 is maintained constant by a control transistor 33. The two transistors 31, 32 are each connected to a respective resistor 35, 36 to form parallel legs of a bridge circuit. At the center of the bridge is an error detection transistor 37 which, when the bridge is balanced, will conduct within its proportional range and maintain a constant voltage at the regulating circuit 21 in the present example of about 4.5 volts as detected at point 38 in the damping circuit 22.

The damping circuit consists of a resistor 40 and capacitors 41, 42, 43. Since the damping circuit is independent it may desirably operate at high impedance. The resistor 40 has a relatively high value such as 750 kilohms and the capacitors 41, 42, 43 are relatively low values depending on the degree of damping required, being 2, 50 and 225 microfarad capacitors in the present example. By leaving all the capacitors 41, 42, 43 in parallel a maximum damping effect is obtained with a response time (with a step-function input) ranging up to approximately 250 seconds. If all but the 2-microfarad capacitor are removed from the circuit, the response time is reduced to approximately 2 seconds.

The error signal developed by the transistor 37 and applied to the regulator circuit 21 regulates the output current from the instrumentation 11 through the regulating transistors 45, 46. The output current is conducted through the second sensing resistor 20 which develops a voltage at point 18 corresponding to that developed by the input current at point 16, and the voltage at point 18 is applied to the transistor 32. If the voltages at points 16 and 18 are the same the currents through both legs of the bridge formed by the transistors 31, 32 and resistors 35, 36 are the same and there is no change in the current in the error-detecting transistor 37, which therefore remains in its proportional range.

If, however, the input signal should increase from 50 percent to 75 percent, for example, reflecting a change in input current from 30 to 40 ma., conduction through the transistor 31 increases, dropping the base voltage of the error detection transistor 37 and driving it to saturation. The saturation current from the transistor 37 causes point 47 to reach approximately 11 volts in the present example, thereby causing the damping capacitors 41, 42, 43 to begin charging through resistor 40 and increasing the voltage at point 38, thus increasing the voltage applied to the regulator circuit 21 as well. With the example given, the voltage at point 38 will rise at a substantially constant rate as determined by the charging of the capacitors 41, 42, 43 from the relatively high voltage of 11 volts at point 47 until the voltage at the second sensing resistor 20 and the point 18 becomes substantially the same as that at point 16, thereby terminating the saturated conduction condition of error detection transistor 37 and stopping the charging of the capacitors 41, 42, 43 quite abruptly. At this point the system is again in equilibrium with an output current corresponding to the 40 ma. input signal current. The output signal has been increased at a roughly constant rate equal to the charging rate of the damping capacitors 41, 42, 43 through the resistor 40.

The effect of this mode of operation is shown in FIG. 3. Instead of the conventional asymptotic exponential resistance-capacitance charging curve of prior art apparatus, the rate of change is essentially independent of the magnitude of the input fluctuation to be damped, and therefore the change takes place in a substantially linear manner until the new equilibrium point is reached and the rate of change stops abruptly. The change in the output current is governed by a resistance-capacitance characteristic representative of a fluctuation greatly larger than the actual change to be accommodated, and the charging curve corresponds to the initial portion of this characteristic. However, because the error detection transistor 37 is abruptly cut off when the required correction has been applied, the correction stops at this point and the system is again in balance.

For a decreasing signal input, the response characteristic is similar. A decreasing input signal sensed by the sensing resistor 15 causes the transistor 31 to conduct less than the transistor 32, unbalancing the bridge in the opposite direction. This change in polarity shifts the error detection transistor 37 from its equilibrium state in the proportional range into sharp cutoff, allowing the damping capacitors 41, 42, 43 to discharge through the resistor 40 until the voltage at point 38 drops sufficiently to cause a corresponding change in the output current through the regulator circuit 21. The error detection transistor 37 remains in cutoff until the voltage at point 18 again corresponds to the newly reduced voltage at point 16, which again balances the bridge and brings the error detection transistor 37 back into its normal proportional condition.

As previously noted, by simple changing the value of the second sensing resistor 20 the output current range may be easily changed without interfering with the operation of the current-limiting circuit 13, the comparison circuit 17 or the damping circuit 22. By removing various ones of the damping capacitors 41, 42, 43 the damping function may also be easily varied. With the lowest capacitance valve the output essentially follows the input, but with increasing capacitance greater damping effect is provided up to the maximum available for extreme damping, as may be necessary in applications in which the sensing transmitter 10 is subject to large amounts of signal noise and abrupt transient conditions. Changing the value of the capacitance in the damping circuit 22 changes the time constant of the resistance-capacitance network therein, but as provided for by the invention the usual exponential time constant is characteristic of the much larger change than is actually accommodated, allowing the correction curve to be approximately linear within the actual range of compensation. When the comparison circuit 17 detects the desired correspondence of input and output signals, the correction function input is abruptly terminated at the new operating point.

As a result of the invention the output signal response to a pulse or step-function input is nearly constant, which is a desirable goal in all applications of process control. The effect of having different response curves for different rates of load change is eliminated, and control system which are "tuned" to handle relatively slow load changes will not become unstable should faster load changes occur. The characteristic of prior art systems which associates a slow rate of load change with a small magnitude change and a fast rate of change with a large magnitude change is eliminated. The rate of output signal change is essentially fixed regardless of the size of the rate of input change. It is therefore possible to tune the rest of the control system for optimum operation without regard to the magnitude of the input changes which must be handled. This feature is of particular advantage when handling a system startup on automatic control, which generally presents the largest load changes encountered during system operations.

The following is claimed as invention:

1. An electronic signal conditioner for conditioning electrical signals passing from a transmitter to control instruments, said conditioner comprising the combination of first sensing means for sensing the amplitude of electrical signals from said transmitter, second sensing means for sensing the amplitude of electrical signals passing through said control instruments, regulator means operatively associated with said control instruments for regulating the amplitude of the electrical signals passing through said instruments, an electrical comparator operatively connected to said first and second sensing means for producing an error signal in response to the predetermined difference between the amplitude of the signals sensed by said first and second sensing means, said comparator being operatively connected to said regulator means for supplying said error signal to said regulator means, and electrical signal-damping means operatively connected to said comparator and said regulator means for damping said error signal.

2. Apparatus as defined in claim 1 in which the first sensing means includes current-sensitive means for detecting input signal current above a predetermined level and limiting means for bypassing current in excess of said level around said comparator.

3. Apparatus as defined in claim 1 wherein the comparator includes a bridge circuit having a first leg including means connected to the first sensing means for producing a leg current in said first leg which is a function of the signal from the transmitter, and a second leg, parallel to said first leg and including means connected to the second sensing means for producing a leg current in said second leg which is a function of the signals passing through the control instruments, whereby the error signal produced is responsive to difference between the currents in the respective legs.

4. Apparatus as defined in claim 3 including a transistor connected between the center points of the respective parallel legs of the bridge circuit so as to conduct within its proportional range during conditions of bridge balance when no signal appears between the respective center points of the parallel legs, said transistor being driven to a saturation condition by substantial variations of one polarity in the signal from the transmitter and to a current cutoff condition for substantial variations of opposite polarity in the signal from the transmitter.

5. Apparatus as defined in claim 1 wherein said damping means includes a resistance-capacitance network, whereby the time constant for the damping function is essentially independent of the absolute magnitude of input signal variation over the normal range of operation.

6. An electronic signal-conditioning method for conditioning electrical signals passing from a transmitter to control instruments, said conditioning method comprising the steps of sensing the amplitude of first electrical signals from said transmitter, sensing the amplitude of second electrical signals passing through said control instruments, comparing the respective amplitudes of said first and second electrical signals and producing an error signal in response to a predetermined difference between the amplitudes of the compared signals, damping said error signal, and regulating the amplitude of said second signal in accordance with the damped error signal.

7. An electronic signal-conditioning method as set forth in claim 6 wherein the respective amplitudes of said first and second electrical signals are sensed across first and second sensing resistors, and the range of the second signals relative to the first signal is changed by changing the value of the second sensing resistor.

8. An electronic signal conditioning method as set forth in claim 6 wherein said damping is effected by a resistance-capacitance network, and the damping level is changed by adjusting the capacitance values in said network.